United States Patent
Butcher

(10) Patent No.: US 11,403,162 B2
(45) Date of Patent: Aug. 2, 2022

(54) SYSTEM AND METHOD FOR TRANSFERRING DIAGNOSTIC DATA VIA A FRAMEBUFFER

(71) Applicant: DELL PRODUCTS, LP, Round Rock, TX (US)

(72) Inventor: Andrew Butcher, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 341 days.

(21) Appl. No.: 16/656,183

(22) Filed: Oct. 17, 2019

(65) Prior Publication Data

US 2021/0117266 A1    Apr. 22, 2021

(51) Int. Cl.
*G06F 11/07* (2006.01)
*G06F 13/20* (2006.01)
*G06F 3/14* (2006.01)

(52) U.S. Cl.
CPC ...... *G06F 11/0787* (2013.01); *G06F 11/0736* (2013.01); *G06F 11/0751* (2013.01); *G06F 13/20* (2013.01); *G06F 3/14* (2013.01)

(58) Field of Classification Search
CPC ............ G06F 11/0787; G06F 11/0751; G06F 11/0778
See application file for complete search history.

(56) References Cited

U.S. PATENT DOCUMENTS

| | | | | |
|---|---|---|---|---|
| 7,702,955 B2* | 4/2010 | de Almeida | ........ | G06F 11/1441 714/10 |
| 7,844,866 B2* | 11/2010 | Austen | ................ | G06F 11/0706 714/57 |
| 8,074,062 B2 | 12/2011 | Yang et al. | | |
| 10,095,559 B2* | 10/2018 | Gambardella | ............ | G06F 8/65 |
| 10,552,729 B2* | 2/2020 | Bacha | ................ | G06N 3/0454 |
| 10,854,242 B2* | 12/2020 | Shabbir | ............... | G06F 11/3037 |
| 11,093,351 B2* | 8/2021 | Xia | ...................... | G06F 11/0766 |
| 2007/0088988 A1* | 4/2007 | Gupta | ................ | G06F 11/3648 714/48 |
| 2013/0265325 A1* | 10/2013 | Ratnakar | ................ | G06K 9/033 345/619 |
| 2013/0265328 A1* | 10/2013 | Lambert | ............... | G06F 11/321 345/629 |
| 2021/0334153 A1* | 10/2021 | Chang | ................. | G06F 11/0778 |

* cited by examiner

*Primary Examiner* — Amine Riad
(74) *Attorney, Agent, or Firm* — Larson Newman, LLP

(57) ABSTRACT

An information handling system includes a first memory with a video framebuffer, which in turn includes a regular video framebuffer and a diagnostic video framebuffer. Detected errors within the information handling system are stored within the diagnostic video framebuffer. In response to the error log data being stored within the diagnostic video framebuffer, a processing unit provides a notification signal. In response to the notification signal, a baseboard management controller reads the error log data from the diagnostic framebuffer, and stores the error log data in a second memory of the baseboard management controller.

20 Claims, 3 Drawing Sheets

SYSTEM AND METHOD FOR TRANSFERRING DIAGNOSTIC DATA VIA A FRAMEBUFFER

FIELD OF THE DISCLOSURE

The present disclosure generally relates to information handling systems, and more particularly relates to transferring diagnostic data via a framebuffer.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements may vary between different applications. Thus information handling systems may also vary regarding what information is handled, how the information is handled, how much information is processed, stored, or communicated, and how quickly and efficiently the information may be processed, stored, or communicated. The variations in information handling systems allow information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, graphics interface systems, data storage systems, networking systems, and mobile communication systems. Information handling systems may also implement various virtualized architectures. Data and voice communications among information handling systems may be via networks that are wired, wireless, or some combination.

SUMMARY

An information handling system includes a first memory with a video framebuffer, which in turn includes a regular video framebuffer and a diagnostic video framebuffer. Detected errors within the information handling system may be stored within the diagnostic video framebuffer. In response to the error log data being stored within the diagnostic video framebuffer, a processing unit may provide a notification signal. In response to the notification signal, a baseboard management controller may read the error log data from the diagnostic framebuffer, and store the error log data in a second memory of the baseboard management controller.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
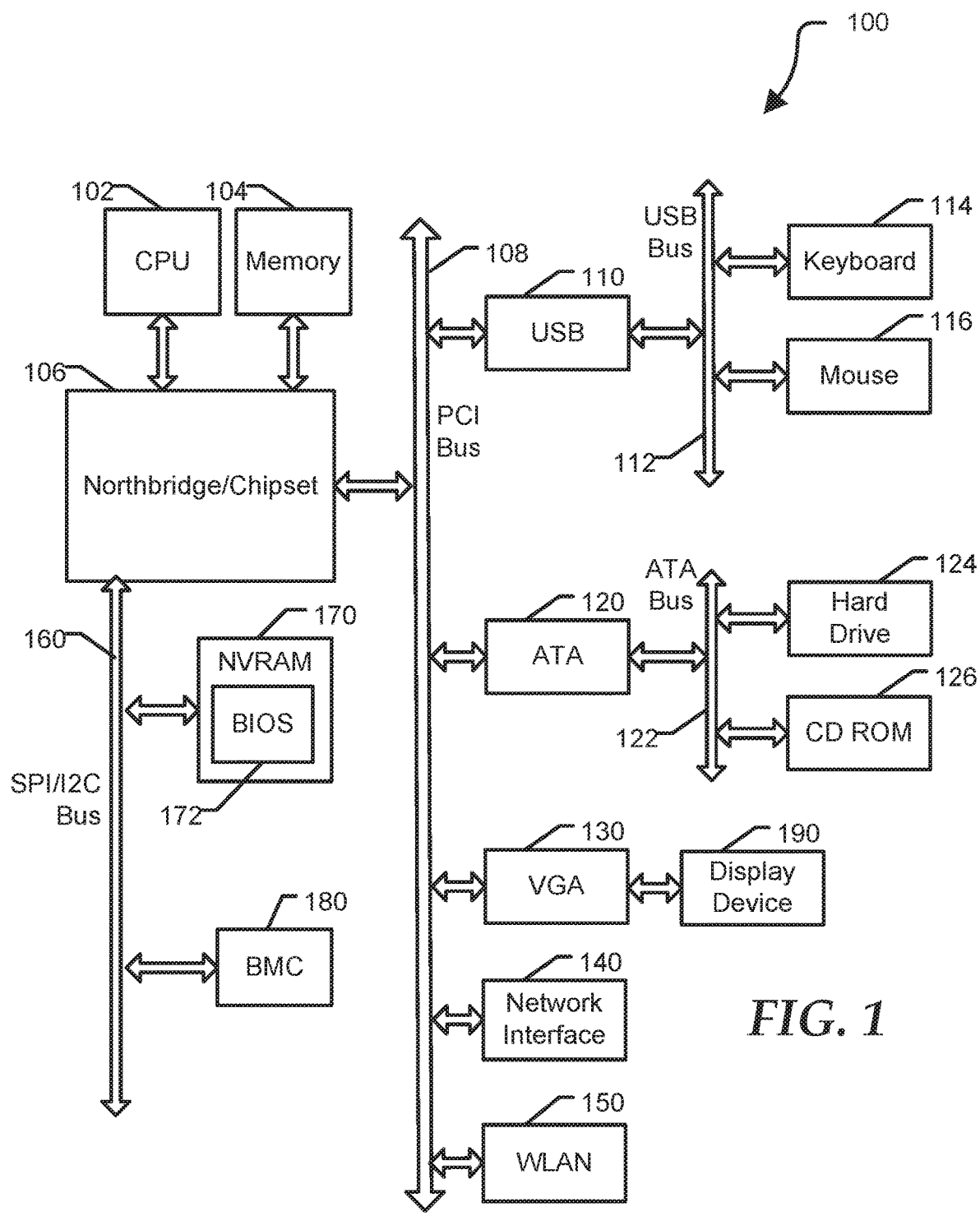
FIG. 1 is a block diagram of a general information handling system according to at least one embodiment of the disclosure.

FIG. 1 illustrates a general information handling system 100 including a processor 102, a memory 104, a northbridge/chipset 106, a PCI bus 108, a universal serial bus (USB) controller 110, a USB bus 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, and a baseboard management controller (BMC) 180. In an embodiment, information handling system 100 may be information handling system 200 of FIG. 2. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional buses, not shown for clarity. For example, system 100 can include multiple processor cores, audio devices, and the like. While a particular arrangement of bus technologies and interconnections is illustrated for the purpose of example, one of ordinary skilled in the art will appreciate that the techniques disclosed herein are applicable to other system architectures. System 100 can include multiple CPUs and redundant bus controllers. One or more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. For example, device controller 130 may provide data to a display device 190 to visually present the information to an individual associated with information handling system 100. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
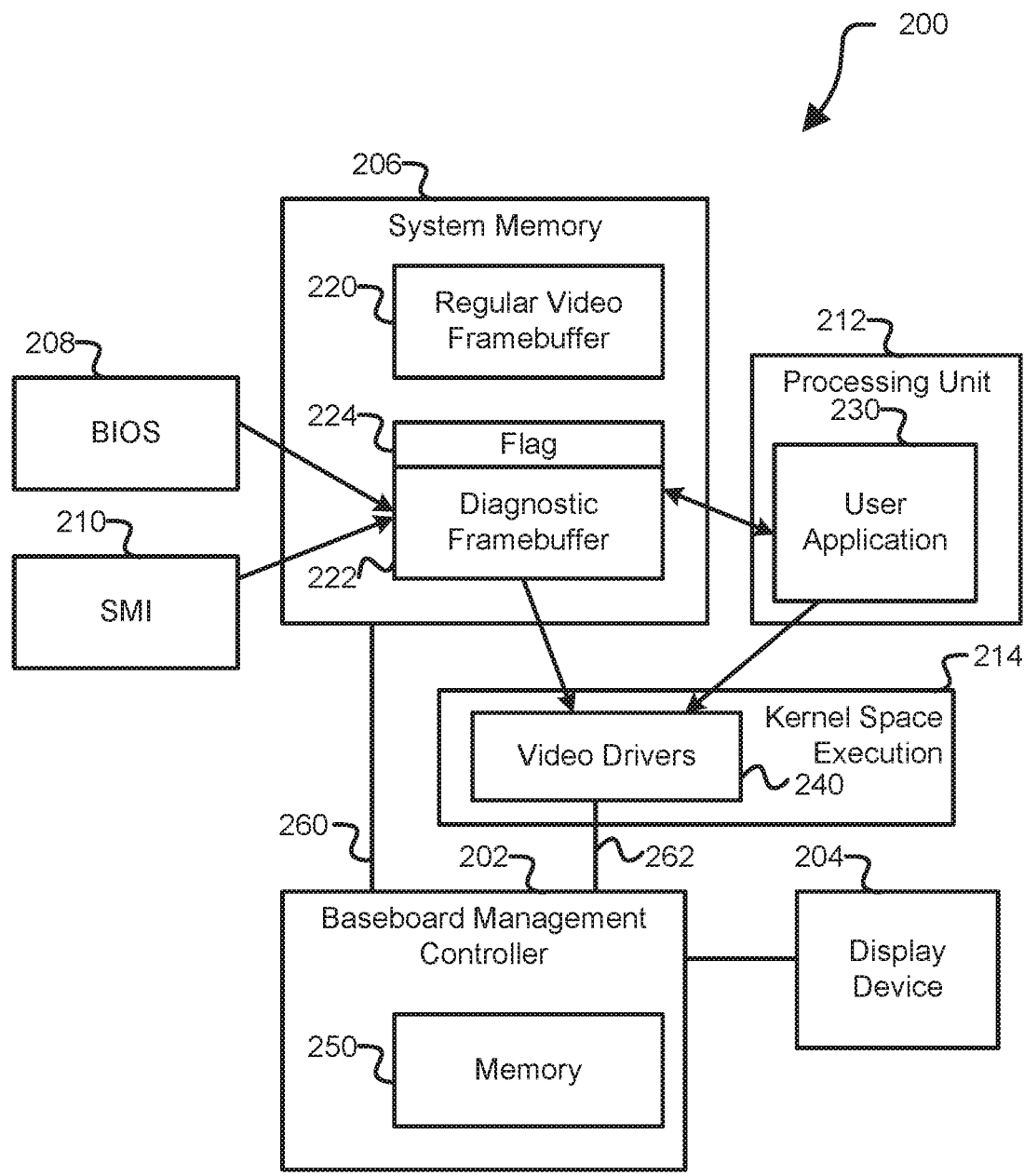
FIG. 2 is a block diagram of a portion of an information handling system for utilizing a video framebuffer for transfer of error log data to a baseboard management controller according to at least one embodiment of the disclosure.

FIG. 2 is a block diagram of a portion of an information handling system 200 for utilizing a video framebuffer for transferring diagnostic or error log data to a baseboard management controller. Information handling system 200 includes a baseboard management controller (BMC) 202, a display device 204, a system memory 206, a basic input/output system (BIOS) 208, a system management interrupt (SMI) 210, a central processing unit (CPU) 212, and a kernel space 214. System memory 206 includes a regular video framebuffer 220 and a diagnostic framebuffer 222. In certain examples, video framebuffer 220 and diagnostic framebuffer 222 may be portions of a single framebuffer or may be separate framebuffers. Diagnostic framebuffer 222 includes an error log indication flag 224. In an example, BIOS 210, SMI 212, kernel space 214, and user application 230 may be executed by one or more processing units with information handling system 200, such as CPU 212.

Information handling system 200 may be employed, in whole or in part, by information handling system 100 illustrated in FIG. 1, or any other system, device, component, etc. operable to employ portions, or all of, the information handling system. In an example, BMC 204 may be any suitable type of controller, such as a BMC in accordance with an IPMI specification, an Integrated Dell Remote Access Controller (iDRAC), or the like. In certain examples, baseboard management controller 202 may communicate with system memory 206 via multiple communication channels, such as communication channels 260 and 262. In an embodiment, communication channel 260 is an inter-integrated circuit ($I^2C$) communication channel and communication channel 262 is a PCIe communication channel. In this embodiment, communication channel 260 provides a relatively slow interface between baseboard management controller 202 and system memory 206, and communication channel 262 provides a relatively fast interface between the baseboard management controller and the system memory via video drivers 240.

During operation of information handling system 200, CPU 212 may execute BIOS 208, and upon completion of the BIOS may execute an operating system (OS). In an example, BIOS 208 may be firmware utilized during a boot process, such as a power-on self-test (POST), to initialize the hardware components within information handling system 200. In an embodiment, the hardware components within information handling system 200 initialized by BIOS 208 may include, but are not limited to, processors and memory devices within the information handling system. BIOS 208 may also provide runtime services for the operating system and other programs with CPU 212.

BIOS 208 can be referred to as a firmware image, and the term BIOS is herein used interchangeably with the term firmware image, or simply firmware. BIOS 208 may include instructions executable by CPU 212 to initialize and test the hardware components of system 200, and to load a boot loader or operating system from a mass storage device. BIOS 208 additionally may provide an abstraction layer for the hardware, i.e. a consistent way for application programs and operating systems to interact with the keyboard, display, and other input/output devices. When power is first applied to information handling system 200, the information handling system may begin a sequence of initialization procedures. During the initialization sequence, also referred to as a boot sequence, components of information handling system 200 may be configured and enabled for operation, and device drivers, such as video drivers 240, may be installed. Device drivers may provide an interface through which other components of information handling system 200 may communicate with a corresponding device.

In an example, BIOS 208 can be substantially compliant with one or more revisions of the unified extensible firmware interface (UEFI) specification. The UEFI standard replaces the antiquated personal computer BIOS system found in some older information handling systems. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer may include customized or proprietary images to provide enhanced control and management of information handling system 200. While the techniques disclosed herein are described in the context of a UEFI compliant system, one of skill will appreciate that the disclosed systems and methods can be implemented at substantially any information handling system having configurable firmware.

During a boot process, BIOS 208 may perform one or more operations to reserve and describe memory regions within system memory 206 for intended uses. For example, BIOS 208 may reserve or designate a portion of a video framebuffer, such as diagnostic framebuffer 222, for host-side diagnostics, such that diagnostic or error log data may be stored within the diagnostic framebuffer. In an example, diagnostic framebuffer 222 may be utilized during both a boot process and during runtime of the OS.

In an example, failures within information handling system 200 may occur and/or be detected during any suitable execution phase. For example, machine check errors (MCE), memory errors, PCIe errors, or the like may be detected, by BIOS 208, during a boot process, during OS runtime by SMI 210, during OS runtime by user application 230, or the like. During the boot process, such as driver execution environment (DXE) phase of a UEFI boot process, BIOS 208 may perform one or more operations to check memory locations of each of the memory devices within information handling system 200. During this memory check, BIOS 208 may detect one or more failures within information handling system 200 and store diagnostic or error log data within diagnostic framebuffer 222. In an example, BIOS 208 may perform any suitable operation to indicate that diagnostic or error log data has been stored in diagnostic framebuffer 222. For example, BIOS 208 may set an error log indication flag 224 within diagnostic framebuffer 222. In an example, error log indication flag 224 also may be utilized by another component within information handling system 200 as will be described below.

During execution of the OS by CPU 212, SMI 210 may perform one or more operations to monitor for events that may cause an interrupt within CPU 212. For example, SMI 210 may determine whether a failure, such as a MCE, memory error, a PCIe error, or the like, has occurred within information handling system 200. In response to the detection of a failure, SMI 210 may store diagnostic or error log data within diagnostic framebuffer 222. In an example, SMI 210 may perform any suitable operation to indicate that diagnostic or error log data has been stored in diagnostic framebuffer 222. For example, SMI 210 may set error log indication flag 224 within diagnostic framebuffer 222.

During execution of the OS by CPU 212, user application 230 may perform one or more operations to monitor for failures within information handling system 200. In response to the detection of a failure, user application 230 may store diagnostic or error log data within diagnostic framebuffer 222.

In an example, CPU 212, via execution of user application 230, may perform one or more operations to determine whether diagnostic buffer 222 should be switched to an active front buffer. As used herein, the active front buffer may refer to a video framebuffer utilized to provide data to a video controller via video drivers 240. Reference to user application 230 herein, may refer to CPU 212 performing one or more operations to execute the user application. In an example, if user application 230 has written the diagnostic or error log data to diagnostic framebuffer 222, the user application may have the knowledge to signal video drivers 240 to indicate that the diagnostic framebuffer is the active front buffer. If BIOS 208 or SMI 210 has written the diagnostic or error log data to diagnostic framebuffer 222, user application 230 may operate as a supervisor application to monitor error log indication flag 224 to determine whether to signal video drivers 240 to indicate that the diagnostic framebuffer is the active front buffer. In an example, the signal indicating that the diagnostic framebuffer is the active front buffer may be any suitable type command including, but not limited to, an ioctl( ) command. In an example, setting diagnostic framebuffer 222 as the active front buffer may cause a momentary video interruption at display device 204 while the diagnostic or error log data is transferred from the diagnostic framebuffer to BMC 202 via video drivers 240 and communication channel 262.

In an example, BMC 202 may operate as the video controller within information handling system 200, such that display data for display device 204 may be provided from video framebuffer 220 to the BMC via video drivers 240 of kernel space 214 and via communication channel 262. In an example, if video framebuffer 220 is the active front buffer, video drivers 240 may receive data from the video framebuffer and provide the data, via the PCIe interface of communication channel 262, to BMC 202 for display on display device 204. Additionally, if diagnostic framebuffer 222 is the active front buffer, video drivers 240 may receive diagnostic or error log data from the diagnostic framebuffer and provide the data, via the PCIe interface of communication channel 262, to BMC 202 for storage within memory 250 of the BMC.

In response to diagnostic framebuffer 222 being set as the active front framebuffer, user application 230 may provide, to BMC 202, a notification signal indicating that diagnostic or error log data is stored within the diagnostic framebuffer. In an example, the notification signal may be provided by user application 230 in any suitable manner including, but not limited to, a short IPMI command or any other signal or command.

In response to receiving the notification signal, BMC 202 may perform one or more operations to read the diagnostic or error log data from diagnostic framebuffer 222 and store the data in a storage device of the BMC, such as memory 250. In an example, BMC 202 may read, via video drivers 240 and communication channel 262, the diagnostic or error log data from diagnostic framebuffer 222. In an example, BMC 202 may read the diagnostic or error log data in any suitable manner including, but to not limited to, reading the data via a physical address of diagnostic framebuffer 222. In response to reading the diagnostic or error log data, BMC 202 may store the data in memory 250. In an example, memory 250 may contain any suitable manner storage locations including, but not limited to, volatile or nonvolatile memory logs for storage of the diagnostic or error log data. In certain examples, the memory logs may be system event logs (SEL). In an example, while the diagnostic or error log data is being transferred from diagnostic framebuffer 222 to BMC 202, a message, such as diagnostic transfer in progress, may be displayed on display device.

In response to the diagnostic or error log data being stored within memory 250 of BMC 202, the BMC may provide any suitable signal to user application 230 indicating the data transfer is complete. For example, BMC 202 may provide an acknowledgement signal to user application 230 via video drivers 240.

In response to the acknowledgement signal, user application 230 may perform one or more operations. For example, in response to the acknowledgement signal, user application 230 may clear error log indication flag 224 to indicate that the diagnostic or error log data has been sent to BMC 202. Additionally, user application 230 may perform an operation to set regular video framebuffer 220 as the active front buffer. For example, user application 230 may provide a signal to video drivers 240 to indicate that regular video framebuffer 220 is the active front buffer. Based on regular video framebuffer 220 being set as the active front buffer, video data may be displayed on display device 204 via data transfers from the regular video framebuffer to the display device via video drivers 240 and BMC 202.

Figure 3:
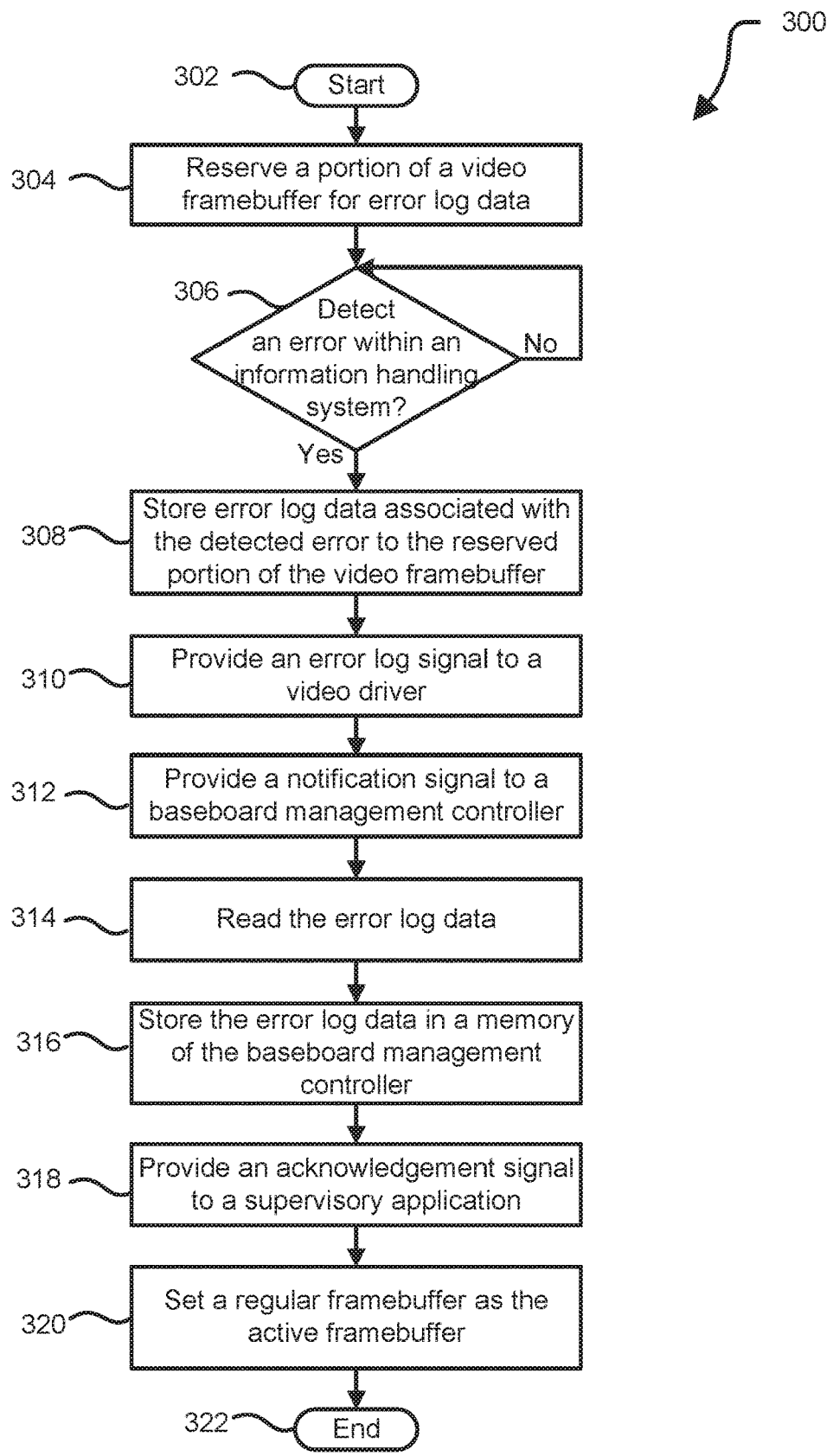
FIG. 3 is a flow diagram illustrating a method for utilizing a video framebuffer for transfer of error log data to a baseboard management controller of an information handling system according to at least one embodiment of the disclosure.

FIG. 3 shows a method 300 for utilizing a portion of a video framebuffer for storing error log data, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 3.

At block 304, a portion of a video framebuffer is reserve for diagnostic or error log data. In an example, a basic input/output system (BIOS) of the information handling system may reserve and describe memory regions within the information handling system. For example, the BIOS may designate a portion of the video framebuffer for storage of host-side diagnostic data.

At block 306, an error is detected within the information handling system. In an example, the error may be any suitable type of failure including, but not limited to machine check errors, memory errors, and PCIe errors. In certain examples, software, such as a system management interrupt (SMI) installed by the BIOS, running on a CPU, the BIOS, and other application executed by the CPU may monitor components within the information handling system for errors.

In response to an error being detected, error log data is stored in the reserved portion of the video framebuffer at block 308. In an example, the error log data may be written to the video framebuffer by any suitable manner including, but not limited to, binary or text encoding. In certain examples, the error log data may be written to the reserved portion of the video framebuffer by any suitable component including, but not limited to, a SMI writing directly to the reserved portion of the video framebuffer, a user diagnostic application writing directly to the reserved portion of the video framebuffer, and the BIOS writing to the video framebuffer.

In response to the error log data being written to the reserved portion of the video framebuffer, an error log signal is provided to a video driver of the information handling system at block 310. In an example, the error log signal may be any suitable type of signal including, but not limited to, a command signal to switch the reserved portion of the video framebuffer to the active front buffer. In certain examples, based on any suitable notification that the error log data has been written to the reserved portion of the video framebuffer, the error log signal may be provided by a user application within the information handling system.

For example, if the user application writes the error log data to the reserved portion of the video framebuffer, the user application knows when to trigger the error log signal. In an example, if the SMI or the BIOS writes the error log data to the reserved portion of the video framebuffer, the user application may operate as a supervisor application and monitor the reserved portion of the video framebuffer for a flag. In response to a flag being set, the user application may provide the error log signal and later clear the flag in response to a data transfer operation being completed.

At block 312, a notification signal is provided to a baseboard management controller. In an example the notification signal may be provided by the user application in any suitable manner including, but not limited to, a short IPMI command or any other signal or command. At block 314, the error log data is read from the reserved portion of the video framebuffer. In an example the baseboard management controller may read the error log data in any suitable manner including, but to not limited to, reading the data via a physical address with a driver, such as the video driver.

At block 316, the error log data is stored in a memory of the baseboard management controller. In an example the error log data may be store in any suitable manner including, but not limited to, a volatile or nonvolatile memory logs within the baseboard management controller. At block 318, an acknowledgement signal is provided to the user application. In an embodiment baseboard management controller may the acknowledgement signal to the user application in any suitable manner including, but not limited to, providing the acknowledgement signal via the video driver.

At block 320, a regular portion of the video framebuffer portion is set as the active framebuffer and the method ends at block 322. In an example the operating system may utilize the regular portion of the video framebuffer to store data before display on a display device. For example the operating system may utilize the regular portion of the video framebuffer, the video driver, baseboard management controller to a display device of the information handling system.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module may include software, including firmware embedded at a processor or software capable of operating a relevant environment of the information handling system. The device or module may also include a combination of the foregoing examples of hardware or software. Note that an information handling system may include an integrated circuit or a board-level product having portions thereof that may also be any combination of hardware and software.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
a first memory including a video framebuffer, wherein the video framebuffer includes a regular video framebuffer and a diagnostic video framebuffer, and wherein detected errors within the information handling system are stored within the diagnostic video framebuffer;
a processing unit to communicate with the first memory, the processing unit to provide a notification signal in response to error log data being stored within the diagnostic video framebuffer; and
a baseboard management controller to communicate with the processing unit and with the first memory, in response to the notification signal, the baseboard management controller to read the error log data from the diagnostic framebuffer, and to store the error log data in a second memory of the baseboard management controller.

2. The information handling system of claim 1, further comprising:
a basic input/output system to reserve the diagnostic video framebuffer as a storage location for the error log data.

3. The information handling system of claim 1, further comprising:
a video driver to communicate with the video framebuffer and with the baseboard management controller, the video driver to read a physical address of the diagnostic video framebuffer, and to provide the error log data from the physical address to the baseboard management controller.

4. The information handling system of claim 1, in response to the error log data being stored the second memory, the baseboard management controller to provide an acknowledgement signal to a user application executed by the processing unit; and in response to the acknowledgment signal, the user application executed by the processing unit to set the regular video framebuffer as an active front buffer.

5. The information handling system of claim 1, in response to the error log data being stored in the diagnostic framebuffer, the processing unit to set the diagnostic video framebuffer as an active front buffer.

6. The information handling system of claim 1, wherein the baseboard management controller further to read the diagnostic video framebuffer via a video driver.

7. The information handling system of claim 1, further comprising:
a display device to communicate with the baseboard management controller, the display device to display a diagnostic transfer in process message while the error log data is being transferred from the diagnostic video framebuffer to the baseboard management controller.

8. A method, comprising:
detecting an error within an information handling system;
storing error log data associated with the detected error to a diagnostic framebuffer of a system memory;
providing, by a processing unit, a notification signal to a baseboard management controller;
in response to the notification signal, reading, by the baseboard management controller, the error log data from the diagnostic framebuffer; and
storing, by the baseboard management controller, the error log data in a memory of the baseboard management controller.

9. The method of claim 8, further comprising:
reserving, by a basic input/output system, the diagnostic framebuffer as a storage location for the error log data.

10. The method of claim 8, wherein the reading of the error log data from the diagnostic framebuffer comprises:
reading, via a video driver, a physical address of the diagnostic framebuffer.

11. The method of claim 8, further comprising:
in response to the storing of the error log data in the memory of the baseboard management controller, providing, by the baseboard management controller, an acknowledgement signal to a user application; and
in response to the acknowledgment signal, setting a regular video framebuffer as an active front buffer.

12. The method of claim 8, wherein the diagnostic framebuffer is a first portion of a video framebuffer and the regular video framebuffer is a second portion of the video framebuffer.

13. The method of claim 8, further comprising:
in response to the error log data being stored in the diagnostic framebuffer, setting the diagnostic framebuffer as an active front buffer.

14. The method of claim 8, wherein the reading of the error log data from the diagnostic framebuffer comprises:
accessing, by the baseboard management controller, the diagnostic framebuffer via a video driver.

15. The method of claim 8, further comprising:
displaying, on a display device, a diagnostic transfer in process message while the error log data is being transferred from the diagnostic framebuffer to the baseboard management controller.

16. A method, comprising:
reserving, by a basic input/output system of an information handling system, a diagnostic framebuffer as a storage location for the error log data;
detecting an error within the information handling system;
storing error log data associated with the detected error to the diagnostic framebuffer of a system memory;
in response to the error log data being stored in the diagnostic framebuffer, setting the diagnostic framebuffer as an active front buffer;
in response to the diagnostic framebuffer being set as the active front buffer, providing, by a processing unit, a notification signal to a baseboard management controller;
in response to the notification signal, reading, by the baseboard management controller, the error log data from the diagnostic framebuffer; and
storing, by the baseboard management controller, the error log data in a memory of the baseboard management controller.

17. The method of claim 16, wherein the reading of the error log data from the diagnostic framebuffer comprises:
reading, via a video driver, a physical address of the diagnostic framebuffer.

18. The method of claim 16, further comprising:
in response to the storing of the error log data in the memory of the baseboard management controller, providing, by the baseboard management controller, an acknowledgement signal to a user application; and
in response to the acknowledgment signal, setting a regular video framebuffer as the active front buffer.

19. The method of claim 16, wherein the diagnostic framebuffer is a first portion of a video framebuffer and the regular video framebuffer is a second portion of the video framebuffer.

20. The method of claim 16, further comprising:
displaying, on a display device, a diagnostic transfer in process message while the error log data is being transferred from the diagnostic framebuffer to the baseboard management controller.

* * * * *